United States Patent
Endo et al.

(10) Patent No.: US 10,065,644 B2
(45) Date of Patent: Sep. 4, 2018

(54) VEHICLE CONTROL SYSTEM

(71) Applicant: TOYOTA JIDOSHA KABUSHIKI KAISHA, Toyota-shi, Aichi-ken (JP)

(72) Inventors: Takahito Endo, Shizuoka-ken (JP); Yasuhiro Oshiumi, Gotemba (JP); Kensei Hata, Shizuoka-ken (JP); Yasuyuki Kato, Numazu (JP); Yushi Seki, Susono (JP); Katsuya Iwazaki, Susono (JP); Hideaki Komada, Gotemba (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 0 days.

(21) Appl. No.: 15/807,206

(22) Filed: Nov. 8, 2017

(65) Prior Publication Data

US 2018/0126991 A1 May 10, 2018

(30) Foreign Application Priority Data

Nov. 9, 2016 (JP) .................................. 2016-219023

(51) Int. Cl.
| | |
|---|---|
| *B60L 9/00* | (2006.01) |
| *B60L 11/00* | (2006.01) |
| *G05D 1/00* | (2006.01) |
| *G05D 3/00* | (2006.01) |
| *G06F 7/00* | (2006.01) |
| *G06F 17/00* | (2006.01) |
| *B60W 30/165* | (2012.01) |
| *B60W 10/08* | (2006.01) |

(Continued)

(52) U.S. Cl.
CPC .......... *B60W 30/165* (2013.01); *B60W 10/08* (2013.01); *B60W 10/18* (2013.01); *B60W 10/20* (2013.01); *B60W 10/30* (2013.01); *B60W 30/162* (2013.01); *G05D 1/0088* (2013.01); *G05D 1/0223* (2013.01); *B60W 2540/00* (2013.01); *B60W 2750/308* (2013.01); *G05D 2201/0212* (2013.01)

(58) Field of Classification Search
CPC .. B60W 30/165; B60W 30/162; B60W 10/08; B60W 10/18; B60W 10/20; B60W 10/30; G05D 1/0223
USPC ........................................................ 701/22
See application file for complete search history.

(56) References Cited

U.S. PATENT DOCUMENTS

| | | | | |
|---|---|---|---|---|
| 2005/0171675 A1* | 8/2005 | Sawamoto | ......... | B60K 31/0008 701/96 |
| 2009/0135049 A1* | 5/2009 | Kikuchi | ................ | B60W 30/17 342/70 |
| 2013/0218413 A1* | 8/2013 | Tanaka | .................... | B60Q 1/143 701/36 |

FOREIGN PATENT DOCUMENTS

| | | |
|---|---|---|
| JP | 2000-052806 A | 2/2000 |
| JP | 2001-001787 A | 1/2001 |

(Continued)

*Primary Examiner* — Mahmoud S Ismail
(74) *Attorney, Agent, or Firm* — Hunton Andrews Kurth LLP

(57) ABSTRACT

A vehicle control system to configured to operate a vehicle autonomously while keeping a safe distance from a preceding vehicle is provided. The vehicle control system is configured to operate the vehicle autonomously to follow a preceding vehicle while keeping a predetermined distance, and to determine a presence of a passenger in the vehicle. If the vehicle is operated autonomously to follow the preceding vehicle while carrying a passenger, the vehicle control system selects a longest distance from the preceding vehicle.

6 Claims, 6 Drawing Sheets

(51) Int. Cl.
  *B60W 10/20*   (2006.01)
  *B60W 10/18*   (2012.01)
  *B60W 10/30*   (2006.01)
  *G05D 1/02*    (2006.01)
  *B60W 30/16*   (2012.01)

(56) References Cited

FOREIGN PATENT DOCUMENTS

| JP | 2007-283837 A | 11/2007 |
| JP | 2014-106854 A | 6/2014 |

\* cited by examiner

VEHICLE CONTROL SYSTEM

CROSS REFERENCE TO RELATED APPLICATIONS

The present invention claims the benefit of priority to Japanese Patent Application No. 2016-219023 filed on Nov. 9, 2016 with the Japanese Patent Office, the entire contents of which are incorporated herein by reference in its entirety.

BACKGROUND

Field of the Invention

Embodiments of the present disclosure relate to the art of a vehicle control system configured to operate the vehicle autonomously.

Discussion of the Related Art

JP-A-2014-106854 describes an automatic driving vehicle control apparatus includes: detection means for acquiring at least any of vehicle traveling state, vehicle surrounding state, and driver state; automatic driving means for automatically driving a vehicle; and determination means for determining whether a condition for automatic driving is satisfied or not. According to the teachings of JP-A-2014-106854, the determination means determines that the automatic driving condition is not satisfied when detection accuracy of the detection means does not satisfy a predetermined criterion. When the determination means determines that the automatic driving condition is satisfied, the vehicle is started the automatic driving. By contrast, when the determination means determines that the automatic driving condition is not satisfied during automatic driving, a warning is given to a driver to cancel the automatic driving. The automatic driving vehicle control apparatus taught by JP-A-2014-106854 is further configured to periodically calculate a stop spot where the vehicle can be safely stopped based on the vehicle surrounding state and the vehicle traveling stat, and to guide the vehicle to the stop spot when the driver does not cancel the automatic driving against the warning to cancel the automatic driving.

The vehicle to which the control apparatus taught by JP-A-2014-106854 is applied may be operated not only manually by a driver but also autonomously, with or without the driver or a passenger. In the conventional art, a plurality of autonomous vehicle may be propelled while stay in a desired formation.

During autonomous operation of the vehicle while carrying a passenger, the vehicle is controlled in such a manner as to improve ride quality. By contrast, during autonomous operation of the vehicle without carrying a passenger, the vehicle is controlled in such a manner as to improve energy efficiency. For example, such autonomous operation of the vehicle may be realized by an adaptive cruise control. However, the conventional adaptive cruise control system may be modified to improve energy efficiency of the vehicle taking into account of air resistance, and to improve ride quality taking account of a safe distance from a preceding vehicle.

SUMMARY

Aspects of embodiments of the present disclosure have been conceived noting the foregoing technical problems, and it is therefore an object of the present disclosure is to provide a vehicle control system configured to operate a vehicle autonomously while keeping a safe distance from a preceding vehicle depending on the situation.

The vehicle control system according to the embodiments of the present disclosure is applied to a vehicle having a prime mover including a motor, a brake device that applies braking torque to a wheel, and a steering system that turns the wheels. The vehicle control system comprises a controller that controls the prime mover, the brake device and the steering system to operate the vehicle autonomously without requiring a manual operation. The controller is configured to: operate the vehicle in such a manner as to follow a preceding vehicle while selecting a distance from the preceding vehicle depending on the situation; determine a presence of a passenger in the vehicle; and increase the distance from the preceding vehicle in a case that the vehicle is operated autonomously to follow the preceding vehicle while carrying a passenger, in comparison with that of a case that the vehicle is operated autonomously to follow the preceding vehicle without carrying a passenger.

In a non-limiting embodiment, the controller may be further configured to: determine a presence of a passenger in the preceding vehicle; and increase the distance from the preceding vehicle in a case that the vehicle is operated autonomously to follow the preceding vehicle without carrying a passenger and that the preceding vehicle carries a passenger, in comparison with that of a case that the vehicle is operated autonomously to follow the preceding vehicle without carrying a passenger and that the preceding vehicle does not carry a passenger.

In a non-limiting embodiment, the controller may be further configured to: determine activation of a headlamp of the vehicle; and increase the distance from the preceding vehicle in a case that the vehicle is operated autonomously to follow the preceding vehicle without carrying a passenger, that the preceding vehicle carries a passenger, and that the headlamp of the vehicle is on, in comparison with that of a case that the vehicle is operated autonomously to follow the preceding vehicle without carrying a passenger, that the preceding vehicle carries a passenger, and that the headlamp of the vehicle is off.

In a non-limiting embodiment, the controller may be further configured to: determine a presence of a passenger in the preceding vehicle; determine activation of a headlamp of the vehicle; reduce the distance from the preceding vehicle in a case that the vehicle is operated autonomously to follow the preceding vehicle without carrying a passenger, that the preceding vehicle carries a passenger, and that the headlamp of the vehicle is on, in comparison with that of the case that the vehicle is operated autonomously to follow the preceding vehicle while carrying the passenger; reduce the distance from the preceding vehicle in a case that the vehicle is operated autonomously to follow the preceding vehicle without carrying a passenger, that the preceding vehicle carries a passenger, and that the headlamp of the vehicle is off, in comparison with that of the case that the vehicle is operated autonomously to follow the preceding vehicle without carrying a passenger, that the preceding vehicle carries the passenger, and that the headlamp of the vehicle is on; and reduce the distance from the preceding vehicle in a case that the vehicle is operated autonomously to follow the preceding vehicle without carrying a passenger and that the preceding vehicle does not carries a passenger, in comparison with that of the case that the vehicle is operated autonomously to follow the preceding vehicle without carrying a passenger, that the preceding vehicle carries the passenger, and that the headlamp of the vehicle is off.

In a non-limiting embodiment, the controller may be further configured to: determine a height of the preceding vehicle; and reduce the distance from the preceding vehicle in a case that the vehicle is operated autonomously to follow the preceding vehicle without carrying a passenger, and that the height of the preceding vehicle is shorter than a predetermined value, in comparison with that of a case that the height of the preceding vehicle is higher than the predetermined value.

In a non-limiting embodiment, the predetermined value may be set based on at least one of a configuration and a type of the preceding vehicle.

In a non-limiting embodiment, the controller may be further configured to: reduce the distance from the preceding vehicle in a case that the vehicle is operated autonomously to follow the preceding vehicle without carrying a passenger and that the preceding vehicle carries a passenger, in comparison with that of the case that the vehicle is operated autonomously to follow the preceding vehicle while carrying the passenger; reduce the distance from the preceding vehicle in a case that the vehicle is operated autonomously to follow the preceding vehicle without carrying a passenger, that the preceding vehicle does not carry a passenger, and that the height of the preceding vehicle is higher than a predetermined value, in comparison with that of the case that the vehicle is operated autonomously to follow the preceding vehicle without carrying a passenger and that the preceding vehicle carries the passenger; and reduce the distance from the preceding vehicle in a case that the vehicle is operated autonomously to follow the preceding vehicle without carrying a passenger, that the preceding vehicle does not carries a passenger, and that the height of the preceding vehicle is shorter than the predetermined value, in comparison with that of the case that the vehicle is operated autonomously to follow the preceding vehicle without carrying a passenger, that the preceding vehicle does not carry a passenger, and that the height of the preceding vehicle is higher than the predetermined value.

Thus, according to the embodiments of the present disclosure, the vehicle control system selects an appropriate distance from the preceding vehicle while the vehicle is operated autonomously to follow the preceding vehicle. Specifically, the control system selects the longest distance from the preceding vehicle in the case that the vehicle is operated autonomously to follow the preceding vehicle while carrying a passenger. According to the embodiments of the present disclosure, therefore, the passenger is allowed to travel without feeling the pressure of the preceding vehicle. By contrast, when the vehicle in autonomous operation follows the preceding vehicle without carrying a passenger, the distance from the preceding vehicle is reduced to mitigate traffic congestion.

As described, the vehicle control system adjust the distance from the preceding vehicle taking account of a presence of a passenger in the preceding vehicle. Specifically, if the vehicle carries a passenger and the preceding vehicle carries a passenger, the vehicle control system increases the distance therebetween longer than that of the case in which neither of the vehicle nor the preceding vehicle carries a passenger. That is, if the preceding vehicle carries a passenger, the vehicle control system keeps the longer distance from the preceding vehicle. According to the embodiments of the present disclosure, therefore, the pressure applied to the passenger in the preceding vehicle may be reduced. By contrast, if neither of the vehicle nor the preceding vehicle carries a passenger, the vehicle control system reduces the distance from the preceding vehicle to mitigate traffic congestion.

As also described, the vehicle control system adjust the distance from the preceding vehicle further taking account of activation of the headlamp of the vehicle. Specifically, if the headlamp of the vehicle is on while the vehicle operated autonomously to follow the preceding vehicle carrying a passenger, the vehicle control system increases the distance from the preceding vehicle in comparison with that of a case in which the headlamp is off. According to the embodiments of the present disclosure, therefore, the pressure applied to the passenger in the preceding vehicle may be reduced.

As also described, the vehicle control system adjust the distance from the preceding vehicle further taking account of a height of the preceding vehicle. Specifically, if the vehicle is operated autonomously to follow the preceding vehicle without carrying a passenger and the height of the preceding vehicle is shorter than the predetermined value, the vehicle control system reduces the distance from the preceding vehicle in comparison with that of a case in which the height of the preceding vehicle is higher than the predetermined value. That is, if the height of the preceding vehicle is shorter than the predetermined value, the distance from the preceding vehicle is reduced as much as possible within a safety range. According to the embodiments of the present disclosure, therefore, an air resistance applied to the vehicle may be reduced as much as possible to improve fuel efficiency. As described, the predetermined value is set taking account of a configuration and a type of the preceding vehicle. For this reason, fuel efficiency may also be improved even if the height of the preceding vehicle is higher than the predetermined value.

Thus, according to the embodiment of the present disclosure, the distance between the vehicle and the preceding vehicle may be adjusted properly depending on the situation and hence traffic congestion may be mitigated in every situation.

BRIEF DESCRIPTION OF THE DRAWINGS

Features, aspects, and advantages of exemplary embodiments of the present invention will become better understood with reference to the following description and accompanying drawings, which should not limit the invention in any way.

DETAILED DESCRIPTION OF THE PREFERRED EMBODIMENT(S)

Embodiments of the present disclosure will now be explained with reference to the accompanying drawings. The control system according to the embodiments of the present disclosure may be applied to a hybrid vehicle powered by an engine and a motor(s), and an electric vehicle powered by the motor(s). In the vehicles of these kinds, electric power may be supplied to the motor not only from a battery but also from a fuel cell.

The control system is configured to operate the vehicle autonomously in such a manner as to follow the preceding vehicle while keeping a safe distance without operating an accelerator and a brake. To this end, a conventional cruise control system and an adaptive cruise control system (ACC) may be employed in the control system. Specifically, the ACC is configured to propel the vehicle autonomously while keeping a safe distance, and to stop the vehicle automatically when the preceding vehicle stops. In addition, the control system is further configured to control a steering angle of wheels autonomously. In the vehicle to which the control system according to the embodiments of the present disclosure is applied, an operating mode may be switched between autonomous mode and manual mode not only by operating a switch but also on the basis of incident signals from sensors.

Figure 1:
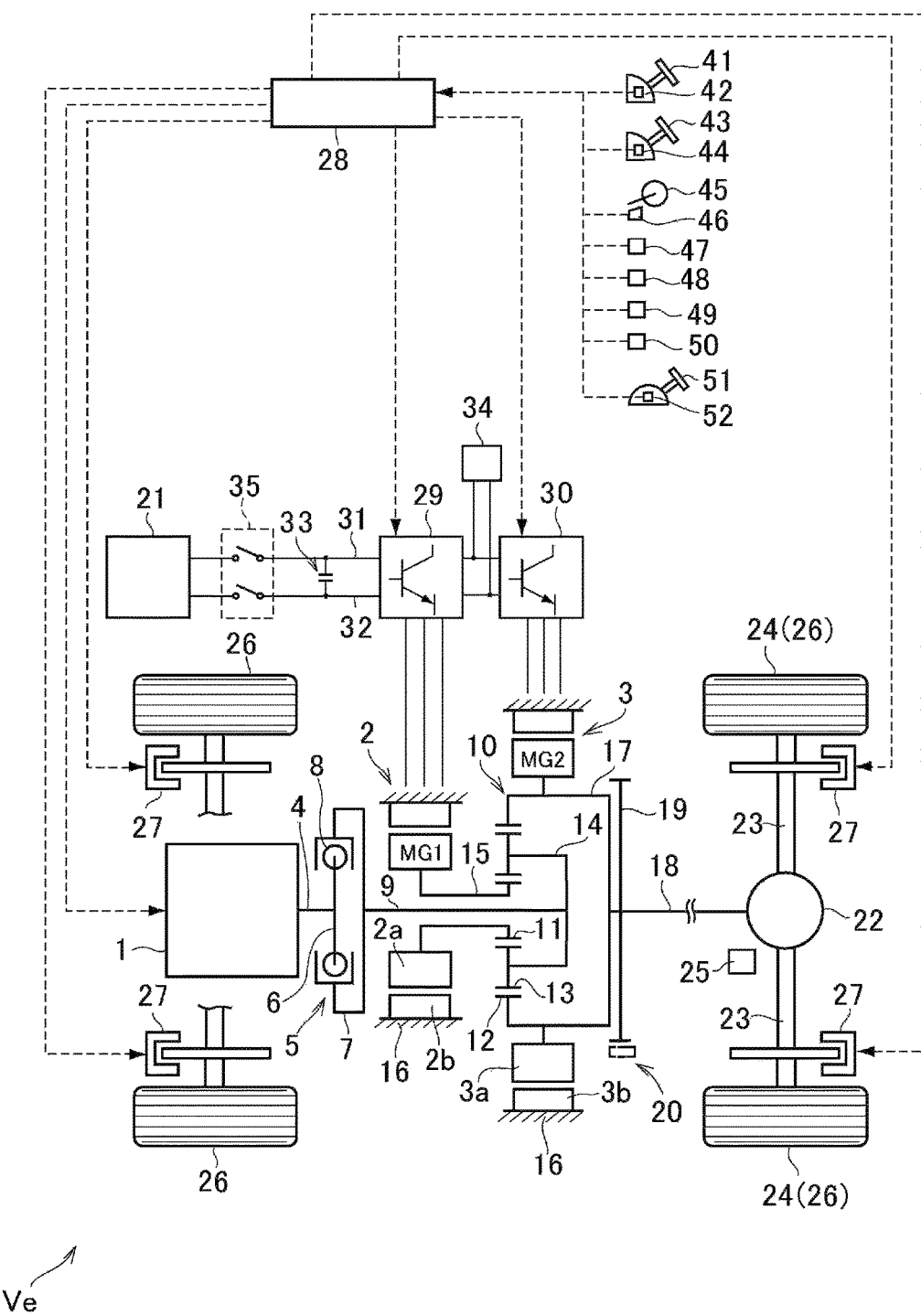
FIG. 1 is a schematic illustration showing an example of a structure of the vehicle to which the control system according to the embodiment is applied.

Referring now to FIG. 1, there is schematically shown a structure of a hybrid vehicle (as will be simply called the "vehicle" hereinafter) Ve to which the control system according to the embodiments of the present disclosure is applied. In the vehicle Ve, a prime mover includes an engine 1, a first motor 2 and a second motor 3. A damper device 5 is disposed on an output shaft 4 of the engine 1 to absorb vibrations resulting from torque pulse. The damper device 5 comprises an input member 6 connected to the output shaft 4 of the engine 1, an output member 7 that is allowed to rotate relatively to the input member 6, and a plurality of elastic members 8 arranged in a circular manner at regular intervals to transmit torque of the input member 6 to the output member 7.

One end of an input shaft 9 is connected to the output member 7 to be rotated integrally therewith, and other end of the input shaft 9 is connected to a single-pinion planetary gear unit 10. The planetary gear unit 10 comprises a sun gear 11 fitted onto the input shaft 9, a ring gear 12 arranged concentrically with the sun gear 11, a plurality of pinion gears 13 interposed between the sun gear 11 and the ring gear 12, and a carrier 14 supporting the pinion gears 13 while allowing to revolve around the sun gear 11.

A first cylindrical shaft 15 extends from the sun gear 11 on the input shaft 9 toward the engine 1 to be connected to the first motor 2. For example, a permanent magnet type synchronous motor having a generating function may be used as the first motor 2. In the first motor 2, a rotor 2a is connected to the first cylindrical shaft 15 of the sun gear 11 to be rotated integrally therewith, and a stator 2b is fixed to a stationary member 16 such as a housing.

A second cylindrical shaft 17 extends from the ring gear 12 toward the second motor 3, and a rotor 3a of the second motor 3 is connected to the second cylindrical shaft 17 to be rotated integrally therewith. A stator 3b of the second motor 3 is fixed to the stationary member 16 such as a housing.

A leading end of the second cylindrical shaft 17 is connected to an output shaft 18 to be rotated integrally therewith, and a parking gear 19 as an external gear is fitted onto the output shaft 18 to be rotated integrally therewith. A parking lock mechanism 20 is arranged outside of the parking gear 19. The parking lock mechanism 20 comprises a parking pawl and a parking actuator (neither of which are shown). The parking actuator selectively brings the parking pawl into engagement with the parking gear 19 thereby locking the output shaft 18. An engagement between the parking pawl and the parking gear 19 may be maintained even after shutting down a battery as a power source.

A leading end of the output shaft 18 is connected to a differential gear unit 22, and the differential gear unit 22 is connected to a pair of drive wheels 24 through drive shafts 23 extending laterally. The drive wheels 24 are turned by a steering system 25. Rotations of the drive wheels 24 and another pair of wheels 26 are individually stopped by a brake device 27.

An operating mode of the vehicle Ve may be further selected from a hybrid mode (to be abbreviated as the "HV mode" hereinafter) in which the vehicle Ve is powered at least by the engine 1, and an electric vehicle mode (to be abbreviated as the "EV mode" hereinafter) in which the vehicle Ve is powered by at least one of the first motor 2 and the second motor 3. Specifically, in the HV mode, the engine 1 generates power in accordance with a required drive force calculated by a controller (i.e., ECU) 28, and the first motor 2 generates reaction torque in such a manner as to deliver the output power of the engine 1 to the drive wheels 24 through the planetary gear unit 10. In this situation, electric power generated by the first motor 2 may be supplied to the second motor 3 so that an output torque of the second motor may be applied to the second cylindrical shaft 17. That is, the output power of the engine 1 may be translated partially into the electric power by the first motor 2, and then translated into kinetic energy again by the second motor 3 to be applied to a torque transmission route between the engine 1 and the drive wheels 24. By contrast, when the first motor 2 serves as a motor while establishing the reaction torque, output torque of the first motor 2 applied to the transmission route may be translated into electric power by the second motor 3, thereby reducing power transmitted through the transmission route.

In the EV mode, the second motor 3 is operated as a motor in such a manner as to achieve a required drive force calculated by the controller 28. In this situation, fuel supply to the engine 1 and power supply to the first motor 2 may be interrupted.

As shown in FIG. 1, the first motor 2 is connected to a first inverter 29, and the second motor 3 is connected to a second inverter 30. The first inverter 29 and the second inverter 30 are also connected to an output terminal of the battery 21 through a positive bus line 31 and a negative bus line 32. The first motor 2 and the second motor 3 are also connected to each other through the positive bus line 31 and the negative bus line 32 so that electric power generated by one of the motors 2 and 3 is supplied to the other motor 2 or 3. A capacitor 33 for storing electric power is connected parallel to the positive bus line 31 and the negative bus line 32, and an auxiliary 34 e.g., a compressor for activating an air conditioner is also connected to the positive bus line 31 and the negative bus line 32. In order to selectively allow and interrupt power supply from the battery 21 to the first inverter 29 and the second inverter 30, a relay switch 35 is individually disposed on the positive bus line 31 and the negative bus line 32 between the output terminal of the battery 21 and the first inverter 29 and the second inverter 30. The relay switch 35 may be turned on and turned off not only manually by manipulating a switch button or key, but also automatically at desired time by setting a timer or the controller 28.

Figure 2:
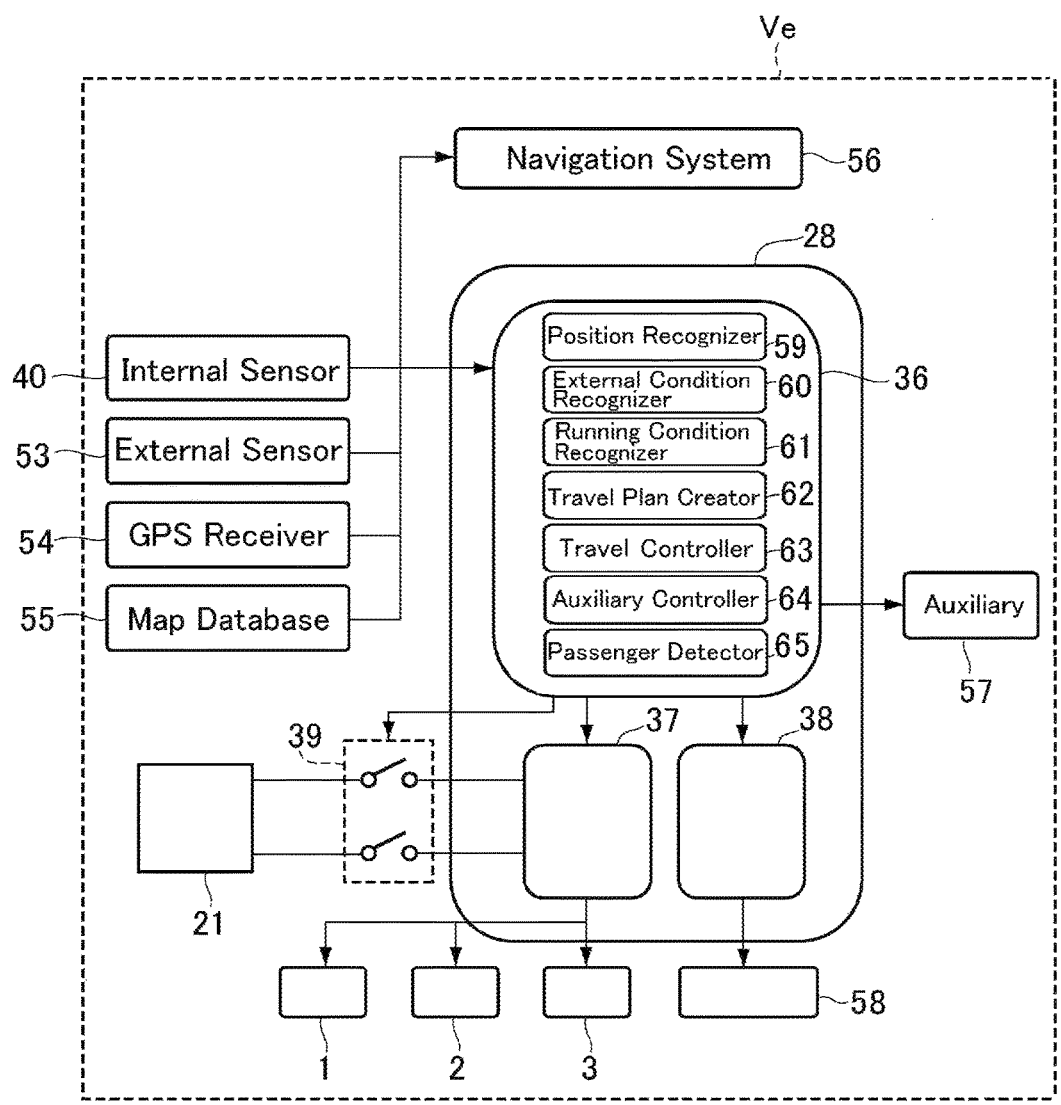
FIG. 2 is a schematic illustration showing a configuration of the control system according to the embodiment.

A configuration of the controller 28 is shown in FIG. 2. The controller 28 comprises a main controller 36, a drive controller 37 and a sub-controller 38. Output signals from the main controller 36 are sent to the drive controller 37 and the sub-controller 38. Incident signals to the drive controller 37 are converted into drive commands and further transmitted to a throttle actuator of the engine 1, the first motor 2, and the second motor 3. Incident signals to the sub-controller 38 is converted into appropriate command signals and further transmitted to actuators of the brake 27 etc.

In order to selectively connect and disconnect the drive controller 37 to/from the battery 21 depending on an operating condition of the switch button or key for energizing the relay switch 35, a main switch 39 is arranged between the battery 21 and the drive controller 37. For example, when the switch button is pressed, the main switch 39 is turned on, and then, if the switch button is pressed for a predetermined period of time, the relay switch 35 is turned on. The main switch 39 is controlled by the main controller 36 to automatically allow and interrupt electric power supply to the drive controller 37.

The main controller 36 is an electronic control unit composed mainly of a microcomputer. To the main controller 36, detection signals and information about operating conditions and behaviors of constituent elements of the vehicle Ve are transmitted from an internal sensor 40. Specifically, the internal sensor 40 includes an accelerator sensor 42 for detecting a position of an accelerator pedal 41, a brake sensor (or switch) 44 for detecting a depression of a brake pedal 43, a steering sensor 46 for detecting a steering angle of the steering wheel 45, a vehicle speed sensor 47 for detecting rotational speeds of the wheels 24 and 26, a longitudinal acceleration sensor 48 for detecting a longitudinal acceleration of the vehicle Ve, a lateral acceleration sensor 49 for detecting a lateral acceleration of the vehicle Ve, a yaw rate sensor 50 for detecting a yaw rate of the vehicle, a shift sensor 52 for detecting a position of a shift lever (or switch) 51 and so on. The main controller 36 transmits command signals for controlling the engine 1, the first motor 2 and the second motor 3 to the drive controller 37, and transmits command signals for controlling the brake 27 and so on to the sub-controller 38 based on incident signals from the internal sensor 40 as well as maps and formulas installed in advance. In FIG. 1, dashed-lines represent transmission of signals between the internal sensor 40 and the controller 28, and between the controller 28 to the engine 1, the first motor 2, the second motor 3, and the brake 27.

The control system according to the embodiments of the present disclosure is configured to operate the vehicle Ve autonomously. Specifically, the control system is configured to execute a starting operation, an accelerating operation, a steering operation, a braking operation, a stopping operation and etc. of the vehicle Ve completely autonomously at the level 4 defined by the NHTSA (National Highway Traffic Safety Administration) or the level 4 or 5 defined by the SAE (Society of Automotive Engineers), while recognizing and observing an external condition and a travelling condition. For this reason, the vehicle Ve may be operated not only autonomously with or without a driver (and a passenger) but also manually by the driver.

As described, the vehicle Ve is operated autonomously while manipulating the engine 1, the first motor 2, the second motor 3, the brake 27, and so on by the controller 28. In addition, the steering system 25, the parking lock mechanism 20 and so on are also controlled by the controller 28.

In order to operate the vehicle Ve autonomously, detection signals from external sensors 53 for detecting external conditions are also sent to the main controller 36. For example, the external sensor 53 includes at least one of an on-board camera, a RADAR (i.e., a radio detection and ranging) a LIDAR (i.e., a laser imaging detection and ranging), an ultrasonic sensor and so on. Data detected by the external sensor 53 may be utilized in an inter-vehicle communication.

Specifically, the on-board camera is arranged inside of a windshield glass, and transmits recorded information about the external condition to the main controller 36. To this end, not only a monocular camera but also a stereo camera having a plurality of lenses and image sensors to achieve a binocular vision may be used as the on-board camera. If the stereo camera is used as the on-board camera, the main controller 36 is allowed to obtain three-dimensional information in the forward direction.

The RADAR is adapted to detect obstacles utilizing radio waves such as millimetric-waves and microwaves, and to transmit detected information to the main controller 36. Specifically, the RADAR detects an obstacle such as other vehicles and so on by emitting radio waves and analyzing the radio waves reflected from the obstacle.

Likewise, the LIDAR is adapted to detect obstacles utilizing laser light and to transmit detected information to the main controller 36. Specifically, the LIDAR detects an obstacle such as other vehicles and so on by emitting laser light and analyzing the laser light reflected from the obstacle.

Information about other vehicles around the vehicle Ve such as positions, speeds, directions, operating modes etc. may be obtained through the inter-vehicle communication system to support safe driving. Such inter-vehicle communication is available among the vehicles individually having an on-board equipment for intelligent transport systems even where infrastructure has not yet been improved.

In addition, the vehicle Ve is further provided with a GPS (i.e., global positioning system) receiver 54, a digital map database 55, and a navigation system 56. Specifically, the GPS receiver 54 is adapted to obtain a position (i.e., latitude and longitude) based on incident signals from GPS satellites, and to transmit the positional information to the main controller 36. The map database 55 may be installed in the main controller 36, but map information stored in external online information processing systems may also be available. The navigation system 56 is configured to determine a travelling route of the vehicle Ve based on the positional information obtained by the GPS receiver 54 and the map database 55.

The main controller 36 carries out calculations based on the incident data or information from the internal sensor 40 and the external sensor 53 as well as the preinstalled data, and calculation results are sent in the form of command signal to the drive controller 37, the sub-controller 38 and the auxiliary 57. The incident signals to the drive controller 37 are converted into drive commands, and further transmitted to the throttle actuator of the engine 1, and the first inverter 29 and the second inverter 30 of the first motor 2 and the second motor 3. The incident signals to the sub-controller 38 are converted into appropriate command signals and further transmitted to actuators 58 of the brake 27, the steering system 25 and so on.

The actuator 58 includes a brake actuator, a steering actuator and so on. Specifically, the brake actuator is adapted to actuate the brake 27 to control braking force applied to the wheels 24 and 26 in response to reception of the command signal from the sub-controller 38. The steering actuator is adapted to activate an assist motor of the steering system 25 to control a steering torque in response to reception of the command signal from the sub-controller 38.

The auxiliary 57 includes devices that are not involved in propulsion of the vehicle Ve such as a wiper, a headlight, a direction indicator, an air conditioner, an audio player and so on.

The main controller 36 comprises a position recognizer 59, an external condition recognizer 60, a running condition recognizer 61, a travel plan creator 62, a travel controller 63, an auxiliary controller 64, a passenger detector 65 and so on.

Specifically, the position recognizer 59 is configured to recognize a current position of the vehicle Ve on the map based on the positional information received by the GPS receiver 54 and the map database 55. The current position of the vehicle Ve may also be obtained from the positional information used in the navigation system 56. Optionally, the vehicle Ve may also be adapted to communicate with external sensors arranged along the road to obtain the current position of the vehicle Ve.

The external condition recognizer 60 is configured to recognize external condition of the vehicle Ve such as a location of a traffic lane, a road width, a road configuration, a road gradient, an existence of obstacles around the vehicle Ve and so on, based on the recorded information of the on-board camera, or detection data of the RADAR or the LIDAR. Optionally, weather information, a friction coefficient of road surface etc. may be obtained according to need.

The running condition recognizer 61 is configured to recognize running condition of the vehicle Ve such as a vehicle speed, a longitudinal acceleration, a lateral acceleration, a yaw rate and so on based on detection result of the internal sensors 40.

The travel plan creator 62 is configured to create a travel locus of the vehicle Ve based on a target course determined by the navigation system 56, a position of the vehicle Ve recognized by the position recognizer 59, and an external condition recognized by the external condition recognizer 60. That is, the travel plan creator 62 creates a travel locus of the vehicle Ve within the target course in such a manner that the vehicle Ve is allowed to travel safely and properly while complying traffic rules.

In addition, the travel plan creator 62 is further configured to create a travel plan in line with the created travel locus. Specifically, the travel plan creator 62 creates a travel plan in line with the target course based on the external conditions recognized by the external condition recognizer 60 and the map database 55.

Specifically, the travel plan is created based on prospective data after few seconds from the present moment to determine a future condition of the vehicle Ve such as a driving force or the like required in future. Optionally, the travel plan may also be created based on prospective data after several ten seconds depending on the external conditions and the running conditions. Thus, the travel plan creator 62 creates a future plan to change a vehicle speed, acceleration, steering torque etc. during travelling along the target course in the form of e.g., a map.

Alternatively, the travel plan creator 62 may also create a pattern to change the vehicle speed, acceleration, steering torque etc. between predetermined points on the travel locus. Specifically, such patterns may be determined by setting target values of those parameters at each point on the travel locus taking account of a required time to reach the point at the current speed.

As described, the controller 28 is configured to work with the adaptive cruise control system, and the travel plan may also be created in such a manner as to follow the preceding vehicle. The adaptive cruise control system may be manipulated by switches arranged in the vicinity of the steering wheel or within a steering pad. Specifically, activation of the cruise control system, selection of a control mode, setting a target distance from a preceding vehicle etc. may be executed by manipulating the switches.

The travel controller 63 is configured to operate the vehicle Ve autonomously in line with the travel plan created by the travel plan creator 62. To this end, specifically, the travel controller 63 transmits command signals to the actuators 58, or the engine 1, the first motor 2 and the second motor 3 through the drive controller 37 and the sub-controller 38.

The auxiliary controller 64 is configured to operate the auxiliaries 57 such as the wiper, the headlight, the direction indicator, the air conditioner, the audio player and so on in line with the travel plan created by the travel plan creator 62.

The passenger detector 65 is configured to determine the existence of passenger in the vehicle Ve and the preceding vehicle. For example, the passenger detector 65 determines the existence of passenger in the vehicle Ve based on a fact that a power switch, an ignition switch, or a start button is turned on, that a passenger sitting on a vehicle seat is detected, that a seat belt is fastened, or that the steering wheel is turned. Meanwhile, the passenger detector 65 determines the existence of passenger in the preceding vehicle by obtaining information about the preceding vehicle through the inter-vehicle communication, or by analyzing information obtained by the on-board camera.

During autonomous operation while carrying a passenger, the vehicle Ve is controlled in such a manner as to improve ride quality. By contrast, during autonomous operation without carrying a passenger, the vehicle Ve is controlled in such a manner as to improve energy efficiency. For example, when the vehicle Ve in autonomous operation follows the preceding vehicle while carrying a passenger, it is preferable to keep a comfortable distance from the preceding vehicle in which the passenger is allowed to travel without feeling the pressure of the preceding vehicle. By contrast, when the vehicle Ve in autonomous operation follows the preceding vehicle without carrying a passenger, it is preferable to keep a distance from the preceding vehicle in such a manner as to improve energy efficiency.

Figure 3:
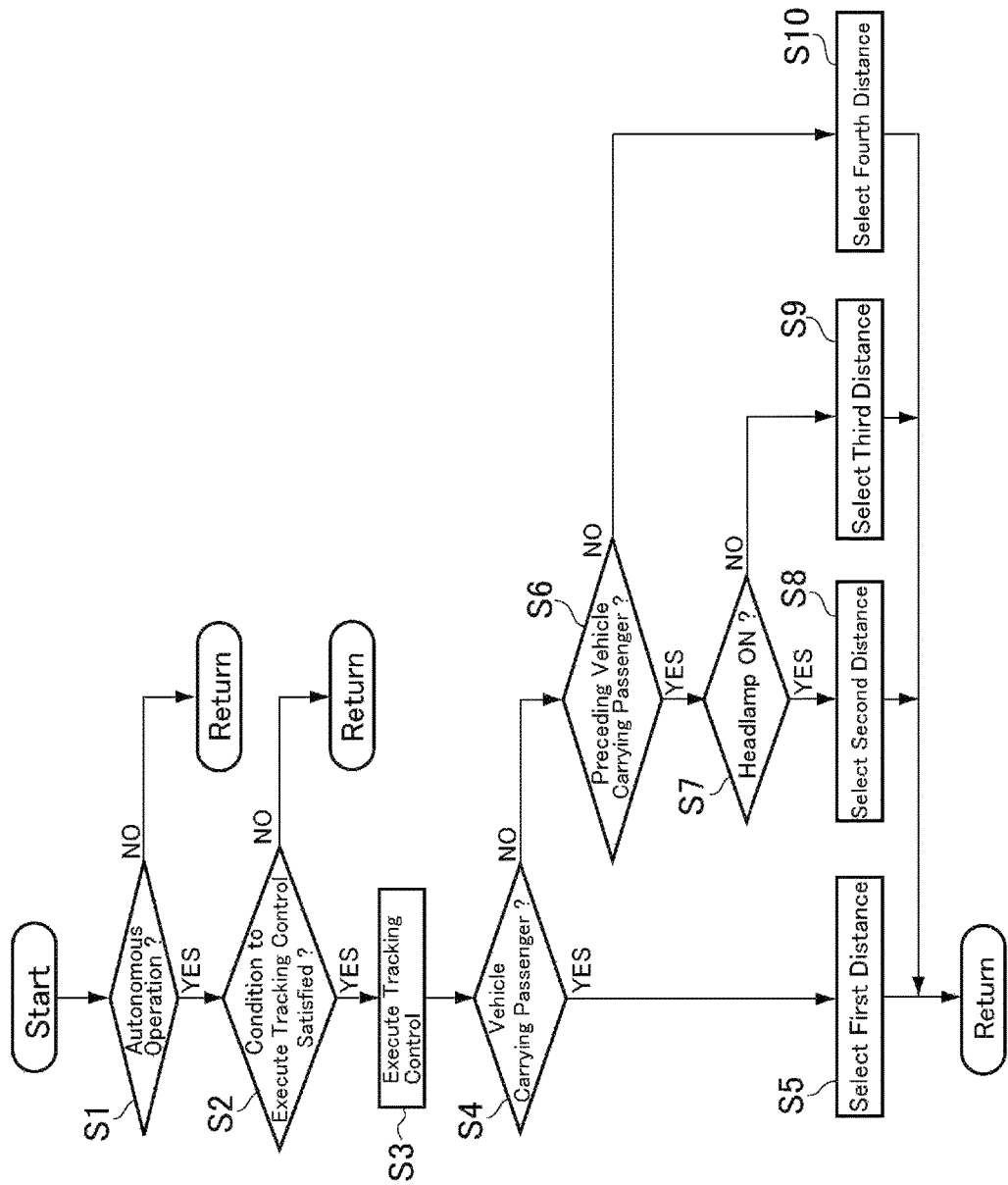
FIG. 3 is a flowchart showing a control example executed by the control system.

In order to adjust the distance from the preceding vehicle during autonomous operation of the vehicle Ve depending on the situation, the controller 28 executes the control shown in FIG. 3. The routine shown in FIG. 3 is repeated at regular time intervals.

At step S1, it is determined whether or not the vehicle Ve is being operated autonomously. Specifically, such determination of the current operating mode can be made based on a signal from the switch for selecting the operating mode, or based on a flag representing the autonomous mode.

If the vehicle Ve is currently not operated autonomously so that the answer of step S1 is NO, the routine returns. In this case, the controller 28 determines that the vehicle Ve is currently operated manually by a driver.

By contrast, if the vehicle Ve is being operated autonomously so that the answer of step S1 is YES, the routine progresses to step S2 to determine satisfaction of a condition to execute a tracking control such as the above-explained the adaptive cruise control. Specifically, such determination at step S2 may be made based on a fact that the switch of the above-explained adaptive cruise control system is turned on to follow the preceding vehicle. Alternatively, the determination at step S2 may also be made based on a fact that driving force and braking force are controlled autonomously in such a manner as to keep a desired distance from the preceding vehicle. In other words, the determination at step S2 may also be made based on a fact that the distance from the preceding vehicle is used as a parameter to control the driving force and the braking force. Instead, the determination at step S2 may also be made based on a fact that the information about the preceding vehicle such as a speed of the preceding vehicle is used as a parameter to control the driving force and the braking force.

If the condition to execute the tracking control is not satisfied so that the answer of step S2 is NO, the routine returns. By contrast, if the condition to execute the tracking control is satisfied so that the answer of step S2 is YES, the routine progresses to step S3 to execute the tracking control to follow the preceding vehicle.

Then, a presence of the passenger in a compartment of the vehicle Ve is determined at step S4. That is, it is determined whether or not the vehicle Ve following the preceding vehicle autonomously is carrying a passenger. For example, the passenger detector 65 determines a presence of the passenger based on a signal from a biometric passenger sensor such as an infrared sensor for detecting a body temperature of the passenger, and a motion sensor such as a Doppler sensor for detecting a body movement of the passenger.

Alternatively, the determination at step S4 may also be made based on an operating state or activating state of the devices arranged in the vehicle compartment. In this case, specifically, a presence of the passenger may be determined based on a fact that a power switch, an ignition switch, a start button or the like is turned on, that a passenger sitting on a vehicle seat is detected, that a seat belt is fastened, that the steering wheel is turned, that the shift lever 51 is moved, or that the accelerator pedal 41 or the brake pedal 43 is operated. Thus, a presence of the passenger in the vehicle compartment may be determined based on an operation or activation of the existing devices arranged in the vehicle compartment.

If the vehicle Ve following the preceding vehicle is carrying a passenger so that the answer of step S4 is YES, the routine progresses to step S5 to set a distance from the preceding vehicle to a first distance in which the passenger is allowed to travel without feeling the pressure of the preceding vehicle. Specifically, in the case that the vehicle Ve is thus operated autonomously to follow the preceding vehicle while carrying a passenger, the distance from the preceding vehicle is set to a distance not too close to the preceding vehicle. In this case, the distance from the preceding vehicle is set to a first distance irrespective of a presence of a passenger in the preceding vehicle and an operating mode of the preceding vehicle. To this end, the first distance is determined based on a result of a simulation or experimentation.

By contrast, if the vehicle Ve following the preceding vehicle is not carrying a passenger so that the answer of step S4 is NO, the routine progresses to step S6 to determine a presence of the passenger in the preceding vehicle. As described, a presence of passenger in the preceding vehicle may be obtained by the passenger detector 65 through the inter-vehicle communication system. Alternatively, if the inter-vehicle communication is not available, an occupation of a front seat or a rear seat in the preceding vehicle may be detected by the on-board camera. If neither of the inter-vehicle communication system nor the board camera is available, the controller determines that the preceding vehicle carries a passenger.

If the preceding vehicle is carrying a passenger so that the answer of step S6 is YES, the routine progresses to step S7 to determine whether or not a headlamp of the vehicle Ve is on. In the case that the preceding vehicle is carrying a passenger, the passenger of the preceding vehicle may be dazzled by the headlamp of the vehicle Ve if the distance between the preceding vehicle and the vehicle Ve is too close. If the headlamp of the vehicle Ve is on so that the answer of step S7 is YES, therefore, the routine progresses to step S8 to set the distance from the preceding vehicle to a second distance that is shorter than the first distance.

By contrast, if the headlamp of the vehicle Ve is off so that the answer of step S7 is NO, the routine progresses to step S9 to set the distance from the preceding vehicle to a third distance that is shorter than the second distance. If the headlamp of the vehicle Ve is on, it is preferable to keep a longer distance from the preceding vehicle to prevent the passenger in the preceding vehicle from being dazzled. For this reason, the second distance is selected in the case that the preceding vehicle is carrying a passenger, and that the headlamp of the vehicle Ve is on. Thus, in the case that the vehicle Ve follows the preceding vehicle while carrying a passenger, the first distance as the longest distance is selected to prevent the passenger from feeling the pressure of the preceding vehicle. By contrast, in the case that the vehicle Ve follows the preceding vehicle without carrying a passenger, the second distance or the third distance is selected to reduce the distance from the preceding vehicle.

Optionally, the second distance may be adjusted with a change in a mode of the headlamp between a high beam and a low beam. Specifically, when the headlamp is switched to the high beam, the second distance may be increased to reduce the pressure applied to the passenger of the preceding vehicle.

Figure 4:
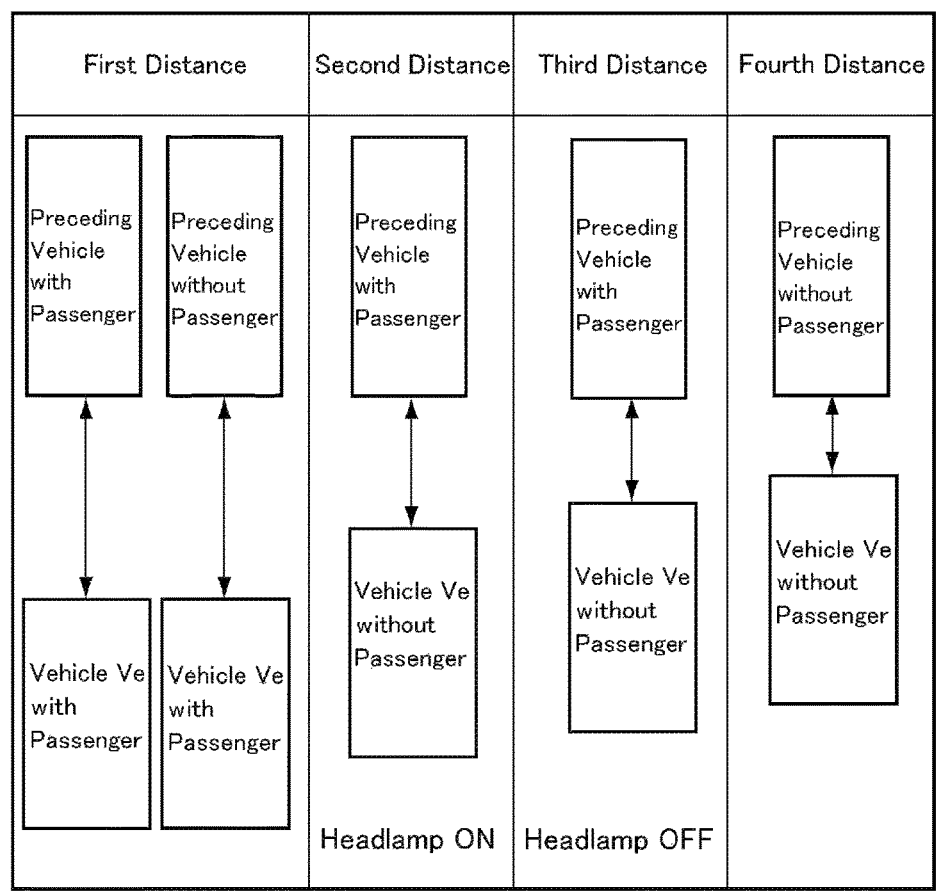
FIG. 4 is an explanatory chart explaining distances from a preceding vehicle selected in the routine shown in FIG. 3.

By contrast, if the preceding vehicle is not carrying a passenger so that the answer of step S6 is NO, the routine progresses to step S10 to set the distance from the preceding vehicle to a fourth distance that is shorter than the third distance. That is, if neither of the vehicle Ve nor the preceding vehicle carry a passenger, no one feels the pressure of the other vehicle and hence the shortest distance is selected. Relations among the first to fourth distances are indicated in FIG. 4. As described, the first distance is longest in the available distances, and the fourth distance is shortest in the available distance. Those distances are determined taking account of the safety requirements.

Thus, according to the control example of the preset disclosure, the distance from the preceding vehicle is selected properly depending on the situation. Specifically, when the vehicle Ve follows the preceding vehicle autonomously while carrying a passenger, the first distance is selected to reduce the pressure of the preceding vehicle. By contrast, when the vehicle Ve follows the preceding vehicle autonomously without carrying a passenger and the preceding vehicle carries a passenger, the distance from the preceding vehicle is reduced to the second or third distance depending on activation of the headlamp to reduce the pressure applied to the passenger in the preceding vehicle. In turn, when neither of the vehicle Ve nor the preceding vehicle carries a passenger, the distance from the preceding vehicle is reduced to the fourth distance that is shortest in the available distances to mitigate traffic congestion.

Next, another control example according to the present disclosure will be explained with reference to FIG. 5. According to another control example, the distance from the preceding vehicle is changed depending on a height of the preceding vehicle. In the following explanation, detailed explanation for the steps in common with the foregoing example will be omitted.

As the foregoing example, if the answers of steps S1, S2 and S4 are YES, the first distance is selected at step S5. By contrast, if the vehicle Ve following the preceding vehicle autonomously is not carrying a passenger so that the answer of step S4 is NO, the routine also progresses to step S6 to determine a presence of a passenger in the preceding vehicle by the above-explained procedure. If the preceding vehicle is carrying a passenger so that the answer of step S6 is YES, the routine progresses to step S101 to set the distance from the preceding vehicle to a fifth distance that is shorter than the first distance.

By contrast, if neither of the vehicle Ve nor the preceding vehicle carries a passenger so that the answer of step S6 is NO, the routine progresses to step S102 to determine whether or not a height of the preceding vehicle is higher than a predetermined value. That is, in the case that neither of the vehicle Ve nor the preceding vehicle carries a passenger, the distance from the preceding vehicle is adjusted depending on a height of the preceding vehicle to reduce an air resistance applied to the vehicle Ve for the purpose of improving fuel efficiency. If the height of the preceding vehicle is higher than the predetermined value so that the answer of step S102 is YES, the routine progresses to step S103 to set the distance from the preceding vehicle to a sixth distance that is shorter than the fifth distance. By contrast, if the height of the preceding vehicle is shorter than the predetermined value so that the answer of step S102 is NO, the routine progresses to step S104 to set the distance from the preceding vehicle to a seventh distance that is shorter than the sixth distance.

For example, a height of the preceding vehicle may be measured based on the information from the on-board camera, the RADAR, or the LIDAR. Specifically, the predetermined height of the preceding vehicle is set in such a manner that the vehicle Ve is allowed to travel within a slipstream as a rear projected area of the preceding vehicle. Optionally, the predetermined value may be set taking account of a configuration of the preceding vehicle such as a width, weight, volume etc. of the preceding vehicle, and a type of the preceding vehicle.

Figure 6:
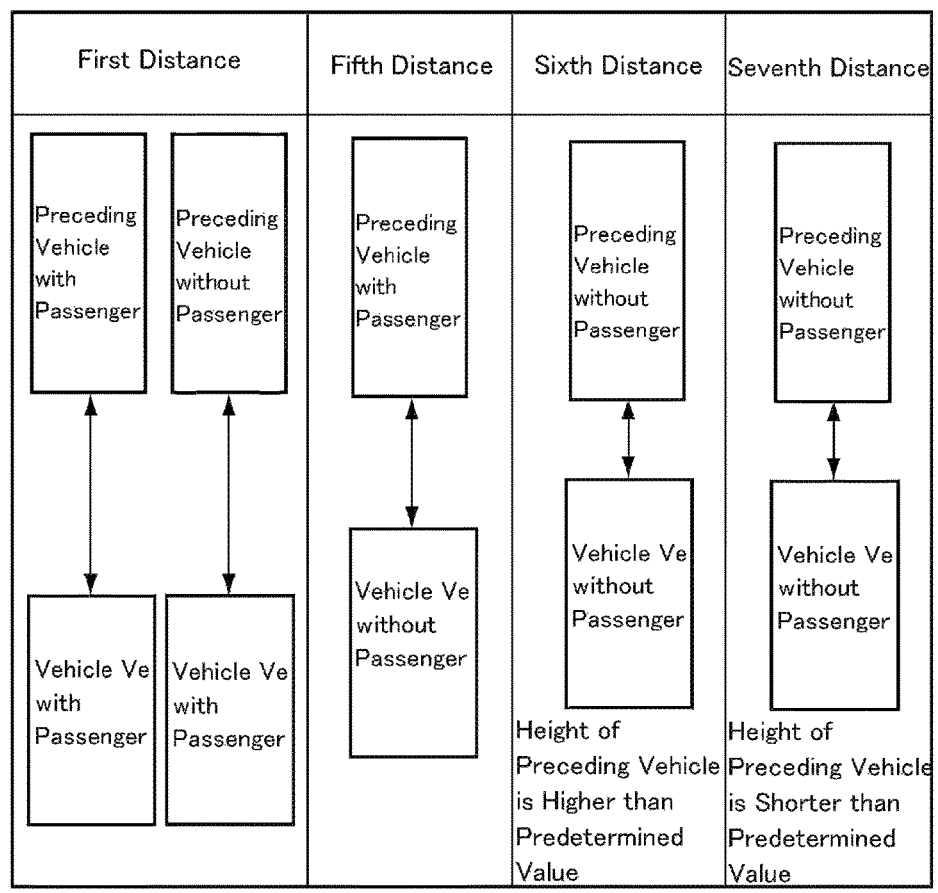
FIG. 6 is an explanatory chart explaining distances from a preceding vehicle selected in the routine shown in FIG. 5.

Thus, according to another control example of the preset disclosure, the distance from the preceding vehicle is selected properly depending on the height of the preceding vehicle. Specifically, when the vehicle Ve autonomously follows the preceding vehicle whose height is higher than the predetermined value without carrying a passenger, the sixth distance is selected to reduce the air resistance applied to the vehicle Ve. By contrast, when the vehicle Ve autonomously follows the preceding vehicle whose height is shorter than the predetermined value without carrying a passenger, the seventh distance is selected to further reduce the air resistance applied to the vehicle Ve. Relations among the first distance and the fifth to fourth distances are indicated in FIG. 6. As described, the first distance is longest in the available distances, and the distance from the preceding vehicle is reduced stepwise from the fifth distance to the fourth distance.

The determination at step S102 may also so be made even if the preceding vehicle carries a passenger. In this case, since the preceding vehicle carries a passenger, the distance from the preceding vehicle is set to be longer than the sixth distance.

Thus, according to another control example of the preset disclosure, the distance from the preceding vehicle may also be selected properly depending on the height of the preceding vehicle. Specifically, when the vehicle Ve follows the preceding vehicle autonomously while carrying a passenger, the first distance is selected to reduce the pressure of the preceding vehicle. By contrast, when the vehicle Ve follows the preceding vehicle autonomously without carrying a passenger, the fifth distance is selected if the preceding vehicle propels while carrying a passenger to reduce the distance from the preceding vehicle to an extent that the passenger in the preceding vehicle will not feel the pressure of the vehicle Ve. In the case that the vehicle Ve autonomously follows the preceding vehicle propelling without carrying a passenger, the sixth distance is selected to reduce the air resistance effectively if the height of the preceding vehicle is higher than the predetermined value. By contrast, if the height of the preceding vehicle is shorter than the predetermined value, the seventh distance is selected to further reduce the distance from the preceding vehicle thereby reducing the air resistance more effectively. That is, the distance from the preceding vehicle may be adjusted in such a manner as to reduce the pressure of the preceding vehicle and to mitigate traffic congestion depending on the situation.

Although the above exemplary embodiments of the present application have been described, it will be understood by those skilled in the art that the present application should not be limited to the described exemplary embodiments, and various changes and modifications can be made within the spirit and scope of the present application. For example, the determination at step S7 in the routine shown in FIG. 7 may also be made when the vehicle Ve stops to adjust the distance from the vehicle stopping in front of the vehicle Ve in such a manner as to prevent a passenger in the vehicle stopping in front of the vehicle Ve from being dazzled by the headlamp of the vehicle Ve.

Figure 5:
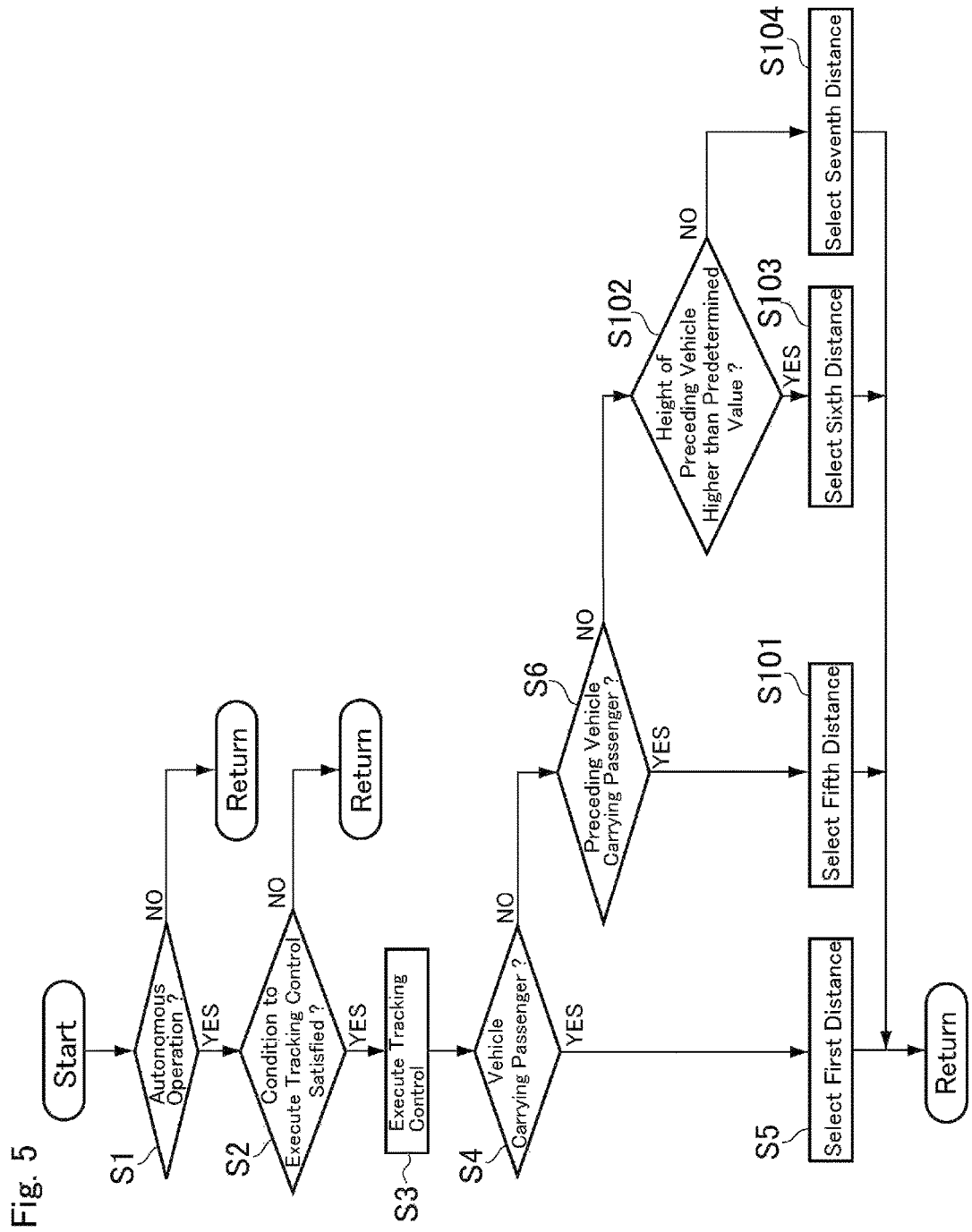
FIG. 5 is a flowchart showing another control example executed by the control system according to the embodiment.

In addition, the flowcharts shown in FIGS. 3 and 5 may be installed in the form of map. Further, the first to the seventh distance may be adjusted arbitrarily according to need.

What is claimed is:

1. A vehicle control system that is applied to a vehicle having a prime mover including a motor, a brake device that applies braking torque to a wheel, and a steering system that turns the wheels, comprising:
   a controller that controls the prime mover, the brake device and the steering system to operate the vehicle autonomously without requiring a manual operation,
   wherein the controller is configured to
   operate the vehicle in such a manner as to follow a preceding vehicle while selecting a distance from the preceding vehicle depending on a current situation,
   determine a presence of a passenger in the vehicle,
   determine a presence of a passenger in the preceding vehicle,
   increase the distance from the preceding vehicle in a case that the vehicle is operated autonomously to follow the preceding vehicle while carrying a passenger, in comparison with that of a case in which the vehicle is operated autonomously to follow the preceding vehicle without carrying a passenger, and
   increase the distance from the preceding vehicle in a case that the vehicle is operated autonomously to follow the preceding vehicle without carrying a passenger and that the preceding vehicle carries a passenger, in comparison with that of a case that the vehicle is operated autonomously to follow the preceding vehicle without carrying a passenger and that the preceding vehicle does not carry a passenger.

2. The vehicle control system as claimed in claim 1, wherein the controller is further configured to
   determine activation of a headlamp of the vehicle, and
   increase the distance from the preceding vehicle in a case that the vehicle is operated autonomously to follow the preceding vehicle without carrying a passenger, that the preceding vehicle carries a passenger, and that the headlamp of the vehicle is on, in comparison with that of a case that the vehicle is operated autonomously to follow the preceding vehicle without carrying a passenger, that the preceding vehicle carries a passenger, and that the headlamp of the vehicle is off.

3. A vehicle control system that is applied to a vehicle having a prime mover including a motor, a brake device that applies braking torque to a wheel, and a steering system that turns the wheels, comprising:
a controller that controls the prime mover, the brake device and the steering system to operate the vehicle autonomously without requiring a manual operation,
wherein the controller is configured to
operate the vehicle in such a manner as to follow a preceding vehicle while selecting a distance from the preceding vehicle depending on a current situation,
determine a presence of a passenger in the vehicle,
determine a presence of a passenger in the preceding vehicle,
determine activation of a headlamp of the vehicle,
increase the distance from the preceding vehicle in a case that the vehicle is operated autonomously to follow the preceding vehicle while carrying a passenger, in comparison with that of a case that the vehicle is operated autonomously to follow the preceding vehicle without carrying a passenger,
reduce the distance from the preceding vehicle in a case that the vehicle is operated autonomously to follow the preceding vehicle without carrying a passenger, that the preceding vehicle carries a passenger, and that the headlamp of the vehicle is on, in comparison with that of the case that the vehicle is operated autonomously to follow the preceding vehicle while carrying the passenger,
reduce the distance from the preceding vehicle in a case that the vehicle is operated autonomously to follow the preceding vehicle without carrying a passenger, that the preceding vehicle carries a passenger, and that the headlamp of the vehicle is off, in comparison with that of the case that the vehicle is operated autonomously to follow the preceding vehicle without carrying a passenger, that the preceding vehicle carries the passenger, and that the headlamp of the vehicle is on, and
reduce the distance from the preceding vehicle in a case that the vehicle is operated autonomously to follow the preceding vehicle without carrying a passenger and that the preceding vehicle does not carries a passenger, in comparison with that of the case that the vehicle is operated autonomously to follow the preceding vehicle without carrying a passenger, that the preceding vehicle carries the passenger, and that the headlamp of the vehicle is off.

4. The vehicle control system as claimed in claim 1, wherein the controller is further configured to
determine a height of the preceding vehicle, and
reduce the distance from the preceding vehicle in a case that the vehicle is operated autonomously to follow the preceding vehicle without carrying a passenger, that the preceding vehicle does not carry a passenger, and that the height of the preceding vehicle is shorter than a predetermined value, in comparison with that of a case that the vehicle is operated autonomously to follow the preceding vehicle without carrying a passenger, that the preceding vehicle does not carry a passenger, and that the height of the preceding vehicle is higher than the predetermined value.

5. The vehicle control system as claimed in claim 4, wherein the predetermined value is set based on at least one of a configuration and a type of the preceding vehicle.

6. A vehicle control system that is applied to a vehicle having a prime mover including a motor, a brake device that applies braking torque to a wheel, and a steering system that turns the wheels, comprising:
a controller that controls the prime mover, the brake device and the steering system to operate the vehicle autonomously without requiring a manual operation,
wherein the controller is configured to
operate the vehicle in such a manner as to follow a preceding vehicle while selecting a distance from the preceding vehicle depending on a current situation,
determine a presence of a passenger in the vehicle,
determine a presence of a passenger in the preceding vehicle,
determine a height of the preceding vehicle,
increase the distance from the preceding vehicle in a case that the vehicle is operated autonomously to follow the preceding vehicle while carrying a passenger, in comparison with that of a case that the vehicle is operated autonomously to follow the preceding vehicle without carrying a passenger,
reduce the distance from the preceding vehicle in a case that the vehicle is operated autonomously to follow the preceding vehicle without carrying a passenger and that the preceding vehicle carries a passenger, in comparison with that of the case that the vehicle is operated autonomously to follow the preceding vehicle while carrying the passenger,
reduce the distance from the preceding vehicle in a case that the vehicle is operated autonomously to follow the preceding vehicle without carrying a passenger, that the preceding vehicle does not carry a passenger, and that the height of the preceding vehicle is higher than a predetermined value, in comparison with that of the case that the vehicle is operated autonomously to follow the preceding vehicle without carrying a passenger and that the preceding vehicle carries the passenger, and
reduce the distance from the preceding vehicle in a case that the vehicle is operated autonomously to follow the preceding vehicle without carrying a passenger, that the preceding vehicle does not carries a passenger, and that the height of the preceding vehicle is shorter than the predetermined value, in comparison with that of the case that the vehicle is operated autonomously to follow the preceding vehicle without carrying a passenger, that the preceding vehicle does not carry a passenger, and that the height of the preceding vehicle is higher than the predetermined value.

* * * * *